United States Patent
Hoffjann et al.

(10) Patent No.: US 7,172,702 B2
(45) Date of Patent: Feb. 6, 2007

(54) METHOD FOR USING WATER IN THE PROCESSING OF FUELS FOR HIGH TEMPERATURE FUEL CELLS

(75) Inventors: Claus Hoffjann, Hamburg (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 195 days.

(21) Appl. No.: 10/611,404

(22) Filed: Jun. 30, 2003

(65) Prior Publication Data
US 2004/0060869 A1    Apr. 1, 2004

(30) Foreign Application Priority Data
Jun. 29, 2002 (DE) ................................ 102 29 309

(51) Int. Cl.
*B01D 61/00* (2006.01)
*H01M 8/04* (2006.01)
*C07C 1/00* (2006.01)
*B01D 63/00* (2006.01)

(52) U.S. Cl. .................... 210/652; 210/767; 429/17; 585/242; 208/134

(58) Field of Classification Search ................ 210/652, 210/767; 429/17, 31; 208/108, 134; 44/302; 149/2; 166/257; 585/241, 240, 242
See application file for complete search history.

(56) References Cited

U.S. PATENT DOCUMENTS

| | | | | |
|---|---|---|---|---|
| 5,747,185 A | * | 5/1998 | Hsu .............................. 429/44 |
| 5,936,194 A | * | 8/1999 | Marlow et al. ................ 149/2 |
| 6,007,699 A | * | 12/1999 | Cole ........................... 208/134 |
| 6,730,138 B2 | * | 5/2004 | Varadaraj et al. .............. 44/302 |
| 6,736,867 B2 | * | 5/2004 | Varadaraj et al. .............. 44/302 |
| 6,838,203 B2 | * | 1/2005 | Zheng .......................... 429/31 |
| 6,869,706 B2 | * | 3/2005 | Varadaraj et al. .............. 429/17 |
| 6,887,610 B2 | * | 5/2005 | Elhamid et al. ............... 429/35 |
| 6,910,536 B2 | * | 6/2005 | Wellington et al. ......... 166/257 |
| 7,081,143 B2 | * | 7/2006 | Varadaraj et al. .............. 44/336 |
| 2003/0165722 A1 | * | 9/2003 | Varadaraj et al. .............. 429/17 |
| 2003/0170513 A1 | * | 9/2003 | Varadaraj et al. .............. 429/17 |
| 2004/0040312 A1 | | 3/2004 | Hoffjann et al. |
| 2004/0121203 A1 | * | 6/2004 | Varadaraj et al. .............. 429/17 |

FOREIGN PATENT DOCUMENTS

| | | |
|---|---|---|
| DE | 195 30 086 | 2/1997 |
| DE | 196 09 475 | 9/1997 |
| DE | 102 16 710 | 4/2003 |
| EP | 0 760 531 | 3/1997 |

\* cited by examiner

Primary Examiner—Ana Fortuna
(74) Attorney, Agent, or Firm—W. F. Fasse; W. G. Fasse

(57) ABSTRACT

Wastewater, particularly black water and/or gray water, is used, for example in an aircraft, for processing fuels used in a high temperature fuel cell. For this purpose a liquid hydrocarbon fuel is used for producing an emulsion for use as fuel in the high temperature fuel cell. The liquid hydrocarbon fuel is preferably kerosene. The liquid hydrocarbon fuel is first emulsified with the wastewater which is first passed through a treatment such as filtering, reverse osmosis, or any other cleaning treatment that makes the wastewater suitable for emulsifying the liquid hydrocarbon fuel. The emulsion is then supplied as fuel to the high temperature fuel cell. Thus, smaller and hence lighter storage facilities for the wastewater can be used.

23 Claims, 1 Drawing Sheet

METHOD FOR USING WATER IN THE PROCESSING OF FUELS FOR HIGH TEMPERATURE FUEL CELLS

PRIORITY CLAIM

This application is based on and claims the priority under 35 U.S.C. §119 of German Patent Application 102 29 309.0, filed on Jun. 29, 2002, the entire disclosure of which is incorporated herein by reference.

FIELD OF THE INVENTION

The invention relates to a method for using wastewater, namely black water and/or gray water, in the processing of fuels for high temperature fuel cells.

BACKGROUND INFORMATION

In the following text the term "black water" refers to water that has been contaminated with any kind of filth, including residue, refuse, feces, and so forth, including gray water. The term "gray water" includes water which exits from water supplying systems or drinking water systems and is only slightly contaminated, for example, used wash water such as hand wash water. The term "wastewater" includes both gray water and/or black water.

Fuels with long chemical bonding chains based on hydrocarbons such as diesel fuel, kerosene, petroleum, and gasoline can be used in high temperature fuel cells because internal reformer processes take place in these fuel cell types. These internal reformer processes make these conventional fuels suitable for use in the energy production process in the fuel cell. For increasing the efficiency, such fuels should be pretreated before being supplied to the fuel cell or cells. For particular applications or types of use it is desirable to subject these fuels to an additional processing with water.

On board of aircraft and other mobile conveyances or in remote stationary facilities, water becomes available in the form of wastewater resulting from the use of the water supply by people. Fuel cells can be used, not only in their function for producing energy, but also for generating fresh water. For this purpose it is necessary to gain or recover sufficient quantities of free hydrogen molecules for the process that proceeds in the fuel cell. These hydrogen molecules can be supplied by fuels based on hydrocarbons. However, water may also be a source for providing hydrogen molecules. We have found that in a special case even wastewater can be used as a hydrogen molecule source.

OBJECTS OF THE INVENTION

In view of the foregoing it is the aim of the invention to achieve the following objects singly or in combination:

- to take advantage of the fact that liquid hydrocarbon fuels and water are substantially easier to store than hydrogen, especially liquid hydrogen;
- to process black water and gray water as a source of hydrogen molecules for use in high temperature fuel cells, whereby the wastewater must be sufficiently precleaned without using distillation to make it suitable for use in a high temperature fuel cell;
- to supply an emulsion of hydrocarbon liquid fuel and water to a high temperature fuel cell where the emulsion is exposed to a reformer process for separating hydrogen molecules from the emulsion;
- to arrange the stages in line so that a continuous supply of optimal quantities is made available directly next to the fuel cell; and
- to reduce the weight of the equipment needed, for example on board of an aircraft, by reducing the size of the wastewater storage facilities and by using at least some of the wastewater for the production of hydrogen molecules.

SUMMARY OF THE INVENTION

The above objects have been achieved according to the invention in a method for preparing fuel for a high temperature fuel cell, by the combination of the following steps:
(a) providing a liquid hydrocarbon fuel,
(b) collecting and preparing waste water to provide prepared waste water suitable for use in said high temperature fuel cell,
(c) emulsifying said liquid hydrocarbon fuel with said prepared waste water to provide an emulsion,
(d) feeding, directly following said emulsifying step, said emulsion through a gap (16) between two concentric pipes, one pipe being connected to an anode of a d.c. power source while the other pipe is connected to a cathode of said d.c. power source, and
(e) electrolytically cracking, in said gap, molecular bindings of organic compounds of said emulsion for preparing said fuel.

By processing or pretreating the wastewater while avoiding distillation a non-critical use of wastewater can be achieved in a high temperature fuel cell.

Following the important emulsifying operation, the process according to the invention preferably includes a desulfurization process and a cracking process for the separation of the hydrogen molecules from the emulsion, whereby the second and third stages, namely the desulfurization and the cracking preferably take place in separate compartments or individual housings within an enclosure of the high temperature fuel cell for an efficient use of heat from the high temperature fuel cell.

The first stage is based on the principle of emulsifying two liquids by mechanical energy, which liquids are not actually mixable, whereby the liquid components in the emulsion are finally and uniformly distributed in the emulsion. According to the invention a hydrocarbon fuel, for example kerosene is emulsified with water in an ultrasound field introduced into an emulsifier container.

The emulsifying stage is preferable followed by an electrochemical process when the emulsion has reached the required electrical conductivity, for example at least 600 μS (micro Siemens). This electrochemical process involves a precracking of the fuel. A so-called gap-electrolysis is suitable for separating the carbon links. This precracking is performed preferably between two concentric cylinders such as two pipes concentrically arranged one within the other, whereby chemical links of organic molecules of hydrocarbons and carbons are cracked out of the used or wastewater. These organic compounds are thereby separated into their initial atoms.

A catalytic process follows the precracking process, whereby sulfur, sulfur compounds including hydrogen sulfide as well as other contaminants are separated from the fuel. The third stage involves the introduction of thermal energy into the emulsion for cracking long chain hydrogen carbons into shorter chains. This cracking is performed to the extent possible by suitable conventional methods in order to convert long chain hydrocarbons into shorter chain links.

In high temperature fuel cells such as SOFCs (Solid Oxide Fuel Cells) it is possible to use various kinds of fuels as a hydrogen supplier at the anode side of the high temperature fuel cell due to the internal reformation processes that are typical for high temperature fuel cell operations. However, for reasons of efficiency, it is preferred to use fuels having short hydrocarbon chains. Long chain hydrocarbons should thus be pretreated for their use in high temperature fuel cells to reduce the chain link or bond lengths. The addition of water enhances or supports the internal reforming processes on the one hand, while on the other hand wastewater quantities may be used which, after pretreatment are regenerated by the internal reforming processes of the high temperature fuel cell.

It is advantageous that long chain hydrocarbon fuels, such as kerosene, are available in mobile conveyances such as commercial aircraft. Such fuels are to be mixed or rather emulsified with water for the use of these fuels in high temperature fuel cells. Advantageously the water quantities that become available on board as wastewater can be prepared by a pretreatment such as filtration, for supplying sufficient pretreated wastewater quantities for the preparation of fuel for use in a high temperature fuel cell, thereby reducing the need for larger storage facilities for the wastewater. The filtration of the wastewater must remove solid components. The degree of the water quality achievable by filtration is of a secondary importance for the use of such water for regeneration in a high temperature fuel cell. Thus, distillation is not necessary for the purposes of the invention. The most important advantages of the present method are seen in the weight reduction which has a direct influence on the fuel consumption of an aircraft and in the need for substantially smaller wastewater storage resulting a further weight reduction and gain of space in an aircraft. Any remaining quantities of wastewaters are also substantially smaller and hence enhance the servicing of the aircraft on the ground.

BRIEF DESCRIPTION OF THE DRAWING

In order that the invention may be clearly understood, it will now be described in detail in connection with example embodiments thereof, with reference to the accompanying drawing in which the single FIGURE shows a block diagram of an apparatus for performing the present method in combination with a high temperature fuel cell.

DETAILED DESCRIPTION OF A PREFERRED EXAMPLE EMBODIMENT AND OF THE BEST MODE OF THE INVENTION

Figure 1:
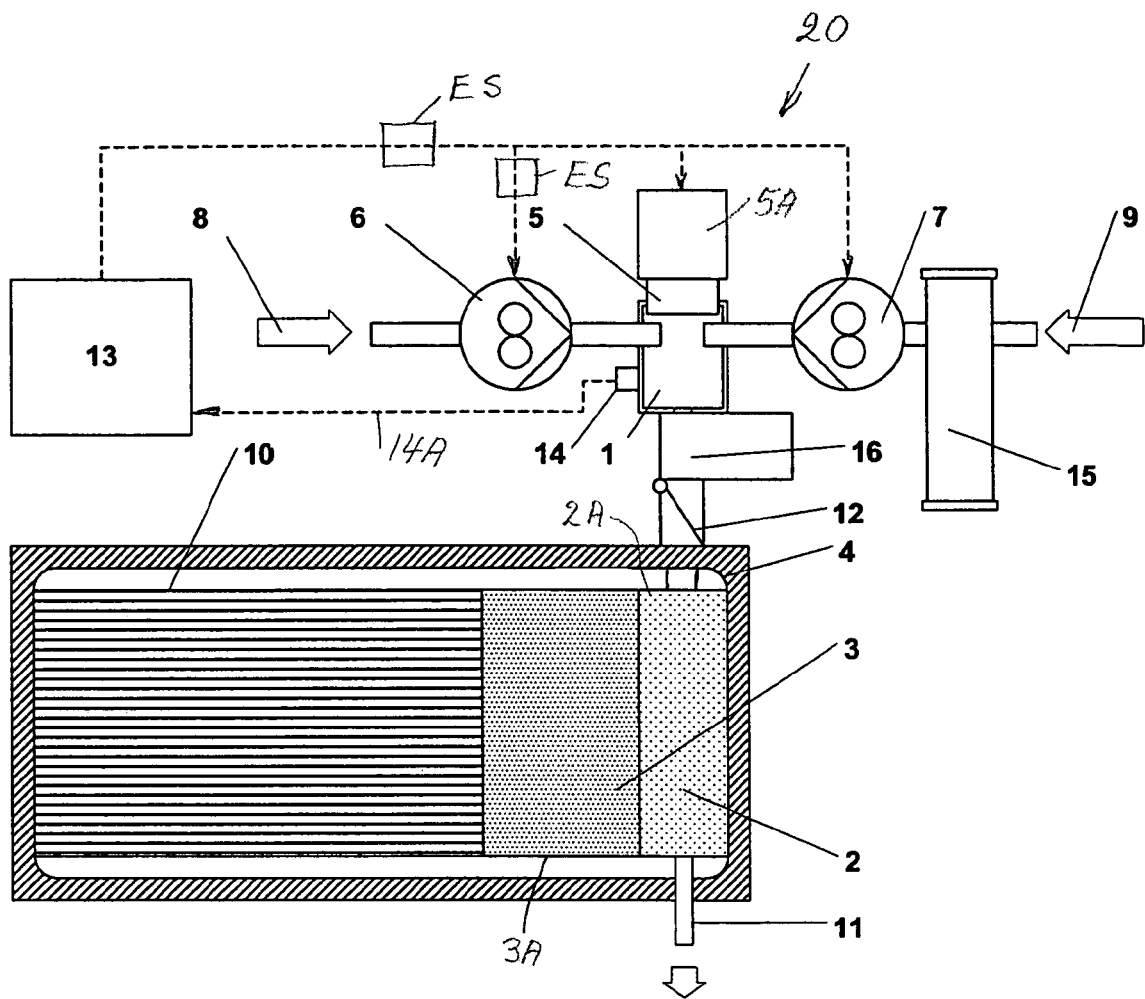

The single FIGURE shows a high temperature fuel cell 10 having its own enclosure 4. A block diagram 20 illustrates schematically the emulsifying process for using wastewater 9 to provide an emulsified fuel for the fuel cell 10. A liquid hydrocarbon fuel 8 is fed through a dosing pump 6 into an emulsifying container 1. Simultaneously, prepared wastewater from a cleaning station 15 is fed through a dosing pump 7 into the same or common emulsifying container 1. A sound frequency generator 5 supplies the emulsifying energy into the emulsifying container 1. A generator known as a "Sonotrode" may be used, for example. It is preferred to feed the fuel 8 and the prepared wastewater from the cleaning station 15 into the emulsifying container 1 directly in front of the "Sonotrode 5", which is driven by a power source 5A.

Upstream of the water dosing pump 7, wastewater 9 is passed through the cleaning station 15 which produces the prepared wastewater that may involve one or more filtrations and/or a reverse osmosis process or any other cleaning operation that provides a prepared wastewater suitable or uncritical for the emulsifying process. However, distillation is not necessary for such preparation. The prepared wastewater from the station 15 and the liquid hydrocarbon fuel 8 are continuously fed into the common emulsifying container 1. The emulsion is thus also continuously discharged from the container 1. The emulsion is preferably but not necessarily supplied to an electrochemical processing station 16. A separation of molecular bonds of the organic compounds in the emulsion is performed in station 16.

The emulsion is then fed from the electrochemical processing station 16 through a nonreturn check valve 12 into a housing 2A which is mounted within the enclosure 4 of the high temperature fuel cell 10. A desulfurization process using a catalyst 2 is performed in the housing 2A, whereby thermal energy of the fuel cell 10 is used for the desulfurization of the emulsion. The desulfurization removes sulfur and sulfur compounds including hydrogen sulfide from the emulsion. The sulfur and sulfur compounds are discharged from the fuel cell through a discharge port 11.

Downstream of the desulfurization process with the catalyst 2 a thermal cracking process 3 takes place in a separate housing 3A which is also contained in the enclosure 4 of the fuel cell 10. Here again the thermal energy available in the high temperature fuel cell 10 is used for cracking the emulsified fuel. In addition to the thermal energy provided by the fuel cell 10, the pressure generated by the dosing pumps 6 and 7 and a catalyst are used for cracking the emulsified fuel.

Following the just described process steps, the fuel that is now in a gaseous state, is supplied to the anode side of the high temperature fuel cell 10. The supply pressure is thereby dependent on the supplied fuel quantity and on the applied or introduced thermal energy. The fuel supply pressure can be controlled in closed loop fashion by the fuel quantity and by the mixture proportions. The mixing ratio as well as the quantities of fuel 8 and water 9 are controlled in closed loop fashion by a control unit 13 which receives at its input emulsion information regarding the emulsion quality from a sensor 14 through a link 14A that may be a conductor or a wireless link. The sensor 14 may be an optical sensor which generates a control signal based, for example, on the turbidity and/or on a color stain distributed in the emulsion. The control signal represents an emulsion quality. In addition or instead, the sensor 14 may measure the electrical conductivity of the emulsion in the emulsifier container 1. The conductivity should be at least 600 µS. The signals provided by the sensor 14 are processed by the control unit 13 such as a CPU, to provide control signals to the pump 6, to the power supply 5A and to the pump 7 as indicated by the respective dashed lines with their arrow heads to provide a closed loop control. Additionally, control parameters such as the water to fuel ratio may be stored in a memory of the CPU 13 and used in a control program.

The pumps 6 and 7 are positive feed non-return pumps, for example gear wheel pumps, that prevent any backflow of fuel and of prepared water. Even if these pumps are intentionally switched off or in case of a power failure, no reflow nor any bypass flow of the fuel and/or water will occur. These pumps 6 and 7 provide a special safety feature in case the high temperature fuel cell 10 must be switched off in an emergency, because by switching off the fuel pump 6 and the sound wave generator 5, water 9 may be pumped by the pump 7 into the now shut-off fuel cell 10 for example if that cell became thermally uncontrollable. The dosing fuel pump 6 will be shut-off first and then the pump 7 may be operated at its maximum capacity for supplying cooling water into the fuel cell through the non-return valve 12 positioned in the enclosure 4 of the fuel cell 10. This non-return or check valve 12 makes sure, in an emergency, that ignited fuel in the cell 10 cannot burn through back into the emulsifying system 20.

The emulsifying system 20, the desulfurization station 2, and the cracking station 3 are preferably installed in a redundant fashion for each fuel cell, so that the fuel cell can continue to receive the emulsion fuel even if one of the system components and/or stations should have failed.

The emulsifying station with its container 1 is preferably equipped with an emergency shutoff (ES) especially for the fuel pump 6. The precracking or removal of the molecular bindings in the emulsion in station 16 should take place at a voltage of about 10 volts between the concentrically arranged pipes that perform the gap-electrolysis. This voltage may be available directly at respective terminals of the high temperature fuel cell 10.

Incidentally, the pretreatment of the water in the station 15 is performed only to the extent necessary for the emulsification to make this operation uncritical. In other words, distillation is not necessary.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for preparing fuel for a high temperature fuel cell, said method comprising the following steps:
    (a) providing a liquid hydrocarbon fuel,
    (b) collecting and preparing waste water to provide prepared waste water suitable for use in said high temperature fuel cell,
    (c) emulsifying said liquid hydrocarbon fuel with said prepared waste water to provide an emulsion,
    (d) feeding, directly following said emulsifying step, said emulsion through a gap (16) between two concentric pipes, one pipe being connected to an anode of a d.c. power source while the other pipe is connected to a cathode of said d.c. power source, and
    (e) electrolytically cracking, in said gap, molecular bindings of organic compounds of said emulsion for preparing said fuel.

2. The method of claim 1, further comprising performing at least one additional cracking step downstream of said electrolytic cracking step, said at least one additional cracking step being performed as any one of an electrochemical cracking step, a thermal cracking step and a catalytic cracking step for reducing longer hydrocarbon chain bonds in said emulsion into still shorter hydrocarbon chain bonds.

3. The method of claim 1, further comprising desulfurizing said emulsion by a step of catalytically withdrawing sulfur and sulfur compounds including hydrogen sulfide from said emulsion.

4. The method of claim 3, further comprising performing said step of desulfurizing in a separate housing positioned inside an enclosure of said high temperature fuel cell.

5. The method of claim 4, further comprising using thermal energy of said high temperature fuel cell for said desulfurizing of said emulsion.

6. The method of claim 3, further comprising performing said step of desulfurizing by chemically binding said sulfur and sulfur compounds to form stable compounds and collecting said stable compounds to avoid discharge into the atmosphere.

7. The method of claim 2, further comprising performing said at least one additional cracking step in a separate housing positioned inside an enclosure of said high temperature fuel cell.

8. The method of claim 2, further comprising using thermal energy of said high temperature fuel cell for performing said at least one additional cracking step.

9. The method of claim 1, further comprising performing said emulsifying step by exposing said prepared waste water and said liquid hydrocarbon fuel to a sound vibration in a container.

10. The method of claim 1, further comprising feeding said liquid hydrocarbon fuel and said prepared waste water into a container to a point in front of an ultrasound vibrator.

11. The method of claim 1, further comprising feeding variable quantities of said prepared waste water and of said liquid hydrocarbon fuel to sustain said emulsifying step.

12. The method of claim 1, further comprising performing said emulsifying step continuously.

13. The method of claim 1, further comprising monitoring said emulsion for providing emulsion quality information and using said emulsion quality information for controlling said emulsifying step.

14. The method of claim 1, further comprising starting said high temperature fuel cell by using $CH_4$ as a starter fuel until an operating temperature of said high temperature fuel cell has been reached, and then switching over said high temperature fuel cell to receive said emulsion as an operating fuel.

15. The method of claim 14, further comprising performing said switching over continuously in a stepless overlapping manner.

16. The method of claim 1, further comprising the step of dosing said liquid hydrogen fuel and said prepared waste water through respective backflow preventing, positive-feed dosing pumps.

17. The method of claim 16, further comprising electronically controlling said respective backflow preventing, positive-feed dosing pumps in a closed loop manner in response to any one of performance parameters of said high temperature fuel cell and emulsion quality parameters.

18. The method of claim 17, further comprising including in said step of electronically controlling a switch-off function for stopping said step of providing said liquid hydrocarbon fuel in response to an emergency.

19. The method of claim 1, further comprising measuring and controlling an electrical conductivity of said emulsion to have an electrical conductivity required for said electrolytical cracking step.

20. The method of claim 1, further comprising using as said d.c. power source a source having an output voltage of about 10 volts.

21. The method of claim 20, further comprising using said high temperature fuel cell for providing said output voltage of about 10 volts by connecting each of said two concentric pipes to a respective electrical terminal of said high temperature fuel cell.

22. The method of claim 1, further comprising using kerosene as said liquid hydrocarbon fuel.

23. The method of claim 1, further comprising performing said step of preparing said waste water by passing said waste water through any one or more of filtration and reverse osmosis steps.

* * * * *